T. E. HOLSTEN & W. LUNDIN.
CAR BRAKE.
APPLICATION FILED OCT. 23, 1915.
1,190,410.
Patented July 11, 1916.
2 SHEETS—SHEET 1.
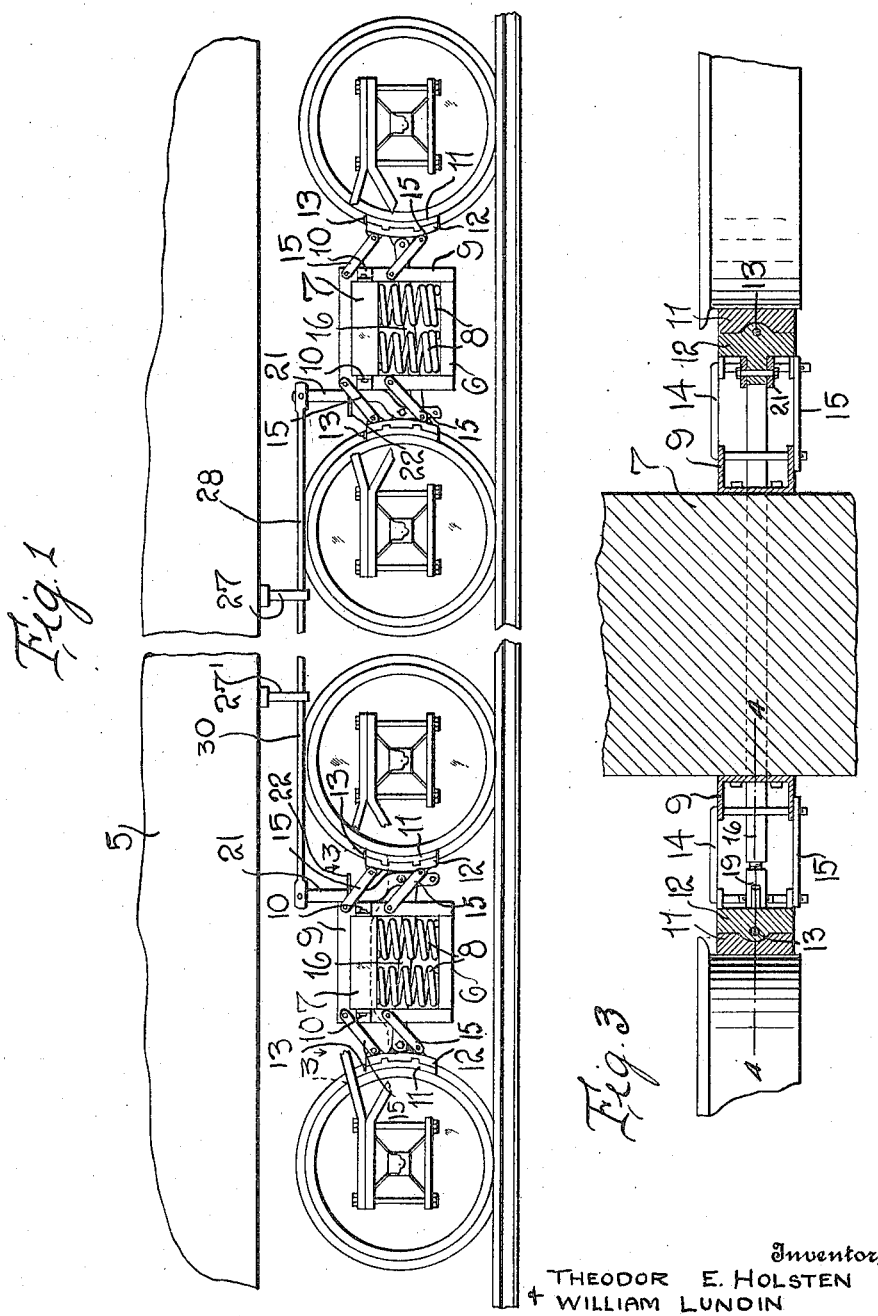
Inventors
THEODOR E. HOLSTEN
& WILLIAM LUNDIN

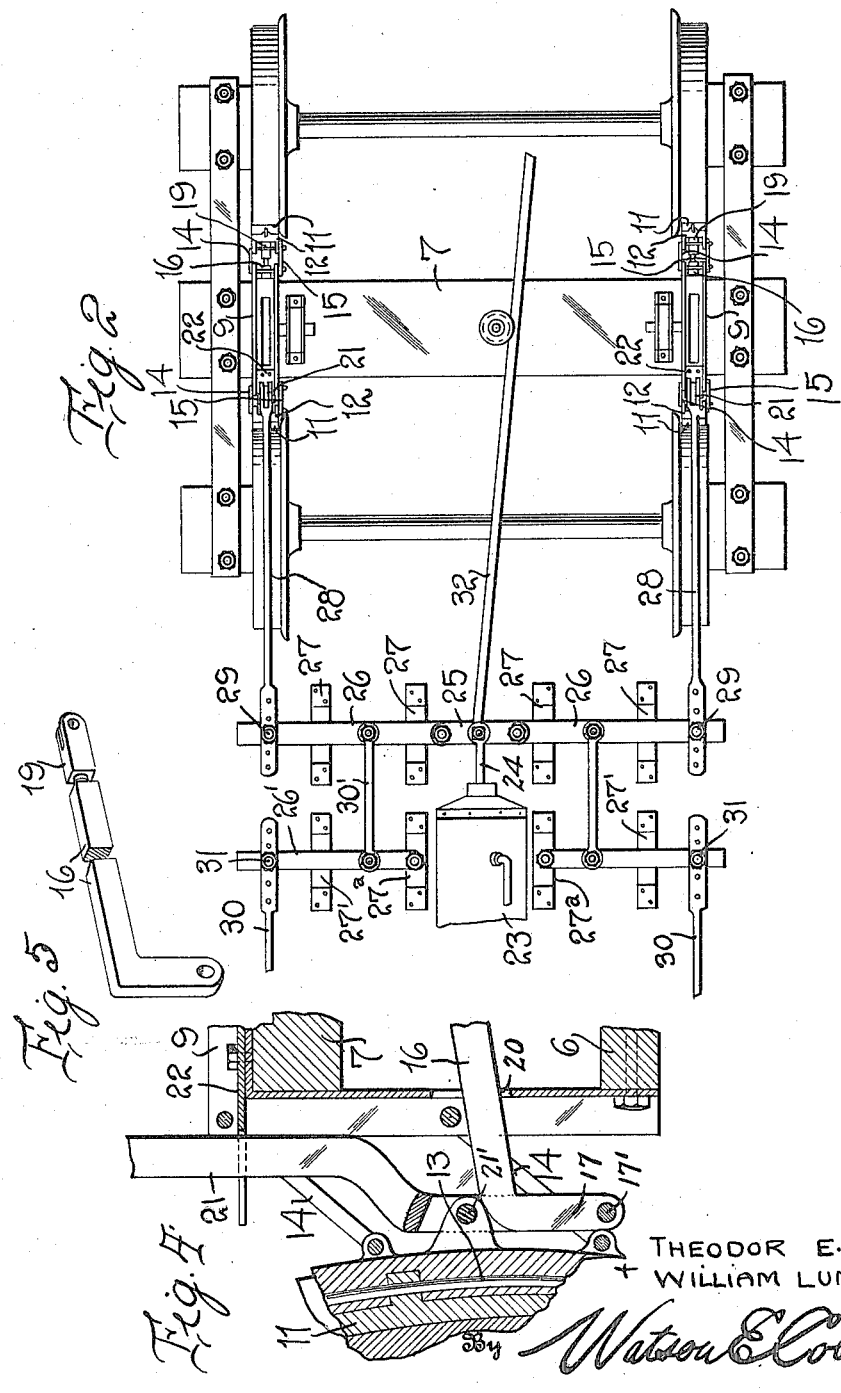

UNITED STATES PATENT OFFICE.

THEODOR E. HOLSTEN AND WILLIAM LUNDIN, OF WATERTOWN, SOUTH DAKOTA.

CAR-BRAKE.

1,190,410. Specification of Letters Patent. Patented July 11, 1916.

Application filed October 23, 1915. Serial No. 57,558.

*To all whom it may concern:*

Be it known that we, THEODOR E. HOLSTEN and WILLIAM LUNDIN, citizens of the United States, residing at Watertown, in the county of Codington and State of South Dakota, have invented certain new and useful Improvements in Car-Brakes, of which the following is a specification, reference being had to the accompanying drawings.

This invention relates to an improved car brake and has for its primary object to provide improved operating means for the brake shoes wherein the use of the ordinary transverse brake beams is eliminated so that liability of the brake beams dropping and wrecking the train will be entirely obviated.

The invention has for another important object to provide an improved equalizing connection between the brake cylinder piston and the brake operating rods extending through the trucks at the opposite ends of the car.

The invention has for still another object to provide an improved mounting for the brake shoes including saddle members arranged upon the truck bolsters, an adjustable operating connection between the wheel engaging brake shoes on opposite ends of the bolster, links supporting the shoe blocks from said saddle, and operating means for the pairs of brake shoes including a lever fulcrumed upon one shoe block and operatively connected to said adjustable connecting member between the shoe blocks.

It is a further general object of the invention to provide an improved brake operating means which is simple and durable in its construction and wherein the several parts may be very easily and quickly assembled and adjusted to obtain the desired extent of movement of the brake shoes when released or applied.

With the above and other objects in view, our invention consists in the novel features of construction, combination and arrangement of parts to be hereinafter more fully described, claimed and illustrated in the accompanying drawings, in which, Figure 1 is a side elevation illustrating the preferred embodiment of our improved car brake; Fig. 2 is a top plan view of one of the trucks, showing the equalizing connection between the brake cylinder piston and the operating means for the brake shoes; Fig. 3 is a horizontal section taken on the line 3—3 of Fig. 1; Fig. 4 is an enlarged detail vertical section taken on the line 4—4 of Fig. 3; and Fig. 5 is a detail perspective view of one of the adjustable connections between the opposed brake shoes.

Referring in detail to the drawings, 5 designates the car which is equipped with the usual trucks, each having a transverse bolster which includes a lower fixed beam 6 mounted in the truck frame in any usual or approved manner, and the upper vertically movable beam 7 which is suitably mounted upon the under side of the car body. Between these two beams, the cushioning springs 8 are arranged. To each of the lower relatively stationary beams 6, the extremities of an inverted U-shaped saddle plate 9 are bolted or otherwise securely fixed. This saddle plate is of channel form in cross-section and extends across the movable beam 7 of the bolster and limits the upward movement thereof. To the opposite edges of this beam, angle brackets 10 are secured, the outwardly projecting flanges of which engage the saddle plate 9 and guide the beam in its vertical movement.

11 designates the brake shoes, each of which is removably secured in a block 12 by means of a key rod 13. The blocks 12 are provided adjacent their opposite ends with ears or lugs each to receive one of the arms of a U-shaped bolt 14, the other arm of said bolt extending through openings provided in the flanges of the saddle plate 9. Links 15 are engaged upon the ends of the bolt arms and retained thereon by means of suitable cotter pins. Each of the brake blocks 12 is also centrally provided with an apertured lug or ear, and to one of the brake blocks a relatively short bar section 19 is pivotally connected. The end of a connecting bar 16 is threaded for adjustable connection with the section 19. The connecting bar 16 extends through vertical slots 20 provided in the opposed portions of the saddle plate 9 on opposite sides of the truck bolster. The operating connections between the brake blocks and the air cylinder piston include a vertically disposed lever 21 which is angularly offset intermediate of its ends, and is slotted or bifurcated to receive the angular end 17 of the connecting bar section 16 and is pivotally connected thereto by a pin 17'. The lever 21 is fulcrumed, as at 21', upon the central ear of one of the brake blocks 12. The lever 21 is guided by a laterally projecting yoke member 22 which is fixed to the intermediate portion of the saddle plate 9.

23 designates the usual air brake cylinder, the air supply for which is controlled through proper connections with the engineer's valve in the usual manner. A piston is arranged to reciprocate in this cylinder, said piston having a rod 24. This rod is pivotally connected to the intermediate section 25 of an equalizing lever. The end sections 26 of this lever, which are pivotally connected to the extremities of the section 25, are movable in suitable guides 27 mounted upon the under side of the car frame.

28 designates the operating rods extending from the vertical levers 21 to one of the car trucks, and having their opposite ends adjustably connected to the lever sections 26 by the pivot bolts 29, said rods being provided with a plurality of spaced openings any one of which is adapted to receive said bolts. A second pair of rods 30, extending from the vertical levers 21 of the brakes on the other truck, are adjustably connected to the outer ends of levers 26' by means of the bolts indicated at 31. The inner ends of these levers are pivotally mounted in suitable brackets 27ª, as clearly shown in Fig. 3, and extend through guides 27'. The levers 26' are connected adjacent to their inner pivoted ends to the corresponding lever sections 26 by means of links 30'.

32 indicates a rod connecting the brake cylinder piston 24 to an ordinary hand brake so that the brakes may be applied by hand independently of the air operated piston.

From the above description, taken in connection with the accompanying drawings, the construction, manner of operation and several advantages of our invention will be clearly and fully understood. When the engineer's brake valve is suitably operated and the piston rod 24 forced outwardly, it will be understood that the levers 21 are simultaneously actuated by the movement of the end sections 26 of the equalizing lever and the levers 26' so that the brakes are instantaneously applied to the truck wheels. In practice, this movement of the brake shoes is preferably only about one-eighth of an inch, though it will be understood that the rod connections 28 and 30 can be properly adjusted so as to move the brake shoes to a greater or less extent in their operation. By entirely eliminating the use of the ordinary brake beams, rattling or banging of the same in the operation of the brakes is avoided and liability of the possible wreckage of the train by such beams becoming loose and dropping between the truck wheels is also obviated. The construction and arrangement of the several coöperating parts of the brake mechanism is exceedingly simple and it will, therefore, be apparent that the invention can be produced and installed upon railway trains at relatively small cost.

While we have shown and described the preferred construction and arrangement of the several parts employed, it is to be understood that the device is susceptible of considerable modification therein and we, therefore, reserve the privilege of adopting all such legitimate changes as may be fairly embodied within the spirit and scope of the invention as claimed.

Having thus fully described our invention, what we desire to claim and secure by Letters Patent is:—

1. In a car brake, a saddle plate mounted upon the truck bolster, brake shoes arranged upon opposite sides of the saddle plate, links pivotally mounted in the saddle plate and connected to the brake shoes, a vertically disposed operating lever pivotally connected at a point intermediate of its ends to the brake shoe on one side of the saddle plate, a bar operatively connected to said lever below its point of connection to said brake shoe, means to adjustably connect the bar to the brake shoe on the opposite side of the saddle plate, and operating means connected to said lever.

2. In a car brake, a saddle plate mounted upon the truck bolster, spaced links pivotally mounted in the saddle plate on each side of the bolster, a brake shoe supported by each pair of links, a vertically disposed lever fulcrumed intermediate of its ends upon one of the brake shoes between the point of connection of the links thereto, a guide for said lever fixed to the saddle plate, a bar pivotally connected to said lever below its point of connection to the brake shoe, said saddle plate having a guide opening through which said bar is disposed, means for adjustably connecting the other end of said bar to the other of the brake shoes, and means for operating said lever.

3. The combination with the spaced car trucks each equipped with brake shoes, an actuating lever for the brake shoes of each pair of car wheels, operating rods connected to said levers, a transversely disposed sectional equalizing lever including central and end sections, said central section being connected to the air brake piston, means for adjustably connecting the rods extending from the brake shoes of one truck to the end sections of said lever, additional pivotally mounted levers, means for adjustably connecting the rods extending from the brake shoes of the other truck to the latter levers, and link rods connecting said latter levers to the end sections of the equalizing lever.

In testimony whereof we hereunto affix our signatures in the presence of two witnesses.

THEODOR E. HOLSTEN.
WILLIAM LUNDIN.

Witnesses:
WALTER STOVER,
J. N. WATKINS.